United States Patent [19]

Sardisco

[11] 4,045,543

[45] Aug. 30, 1977

[54] PRODUCTION OF POTASSIUM SULFATE AND HYDROGEN CHLORIDE

[75] Inventor: John B. Sardisco, Shreveport, La.

[73] Assignee: Pennzoil Company, Shreveport, La.

[21] Appl. No.: 630,954

[22] Filed: Nov. 12, 1975

[51] Int. Cl.² .......................... C01B 7/08; C01D 5/02
[52] U.S. Cl. ................... 423/482; 423/552; 423/520
[58] Field of Search .............. 423/199, 202, 481, 482, 423/551, 552, 520

[56] References Cited

U.S. PATENT DOCUMENTS

| 995,105 | 6/1911 | Thompson | 423/552 |
| 2,816,820 | 12/1957 | Pernert | 423/482 |
| 2,902,341 | 9/1959 | Baniel et al. | 423/482 |
| 3,687,639 | 10/1972 | Barlow | 423/552 |

FOREIGN PATENT DOCUMENTS

| 47-15454 | 9/1972 | Japan | 423/482 |
| 1,145,390 | 3/1969 | United Kingdom | 423/482 |
| 460 | 2/1865 | United Kingdom | 423/199 |

OTHER PUBLICATIONS

Seidel, A., Solubilities of Inorganic and Metal Organic Compounds, American Chemical Society, Washington, DC, 1965, 4th Ed., vol. II, pp. 116, 133–135, 297–299, 301, 982–984.

Primary Examiner—Earl C. Thomas
Assistant Examiner—Gary P. Straub
Attorney, Agent, or Firm—Lowe, King, Price & Markva

[57] ABSTRACT

Potassium sulfate ($K_2SO_4$) is prepared by reaction of potassium chloride and sulfuric acid in an aqueous medium by initially removing evolved HCl in the gaseous form at temperatures of about 65°–120° C., then removing the remaining HCl as an HCl/water azeotrope at temperatures of about 90° to 110° C., restoring to the reaction mixture the amount of water removed with the azeotrope, and permitting the potassium sulfate to crystallize from the solution.

6 Claims, 1 Drawing Figure

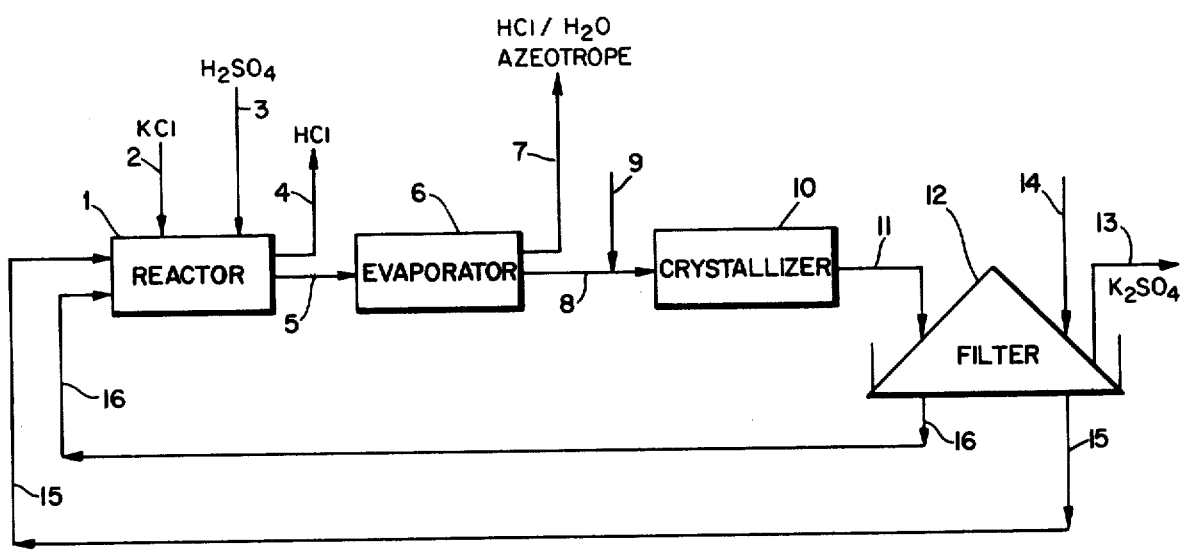

PRODUCTION OF POTASSIUM SULFATE AND HYDROGEN CHLORIDE

CROSS-REFERENCE TO RELATED APPLICATIONS

This application is related to U.S. application Ser. No. 545,554, filed Jan. 30, 1975 now U.S. Patent No. 3,998,935.

BACKGROUND OF THE INVENTION

1. Field of the Invention

This invention relates to the manufacture of potassium sulfate and more particularly to a method for the preparation of potassium sulfate by the reaction of potassium chloride and sulfuric acid contained in an aqueous solution under moderate reaction conditions and without isolation of intermediate potassium bisulfate.

2. Description of the Prior Art

Potassium sulfate is a well known inorganic compound which has found great utility in many areas, for example, as a fertilizer and as an intermediate for the production of useful products. Consequently, the prior art has been aware of various methods for preparation of potassium sulfate for many years. In one common procedure, potassium sulfate has been prepared by the reaction of potash (KCl) and sulfuric acid. However, it is necessary to carry out such reactions under rather severe reaction conditions in order to eliminate the hydrogen chloride evolved during the reaction and shift the reaction toward production of the potassium sulfate. An inherent problem in carrying out this process is that it is a two step reaction involving an intermediate reaction in which the potash and sulfuric acid react to form potassium bisulfate ($KHSO_4$) with the elimination of one mole of hydrogen chloride. It has been difficult heretofore to carry the reaction to completion and eliminate two moles of hydrogen chloride in conducting this reaction in view of the thermodynamics involved in the reactions being carried out. For these reasons, it has been necessary for the art to utilize rather extreme reaction conditions, e.g. temperatures of well above 150° C. and higher in order to obtain an economically attractive yield of potassium sulfate of reasonable purity from the reaction. These extreme reaction conditions however merely cause additional problems as the strong sulfuric acid and chlorine present at high temperatures cause severe corrosion problems. Therefore, a clear need remains in the art for methods by which potassium sulfate can be produced under moderate reaction conditions utilizing readily available starting materials.

In most of the prior art procedures, the key to a successful process resides in complete elimination of the HCl gas. A large body of art is available which discloses such reactions involving the production of $K_2SO_4$ or $Na_2SO_4$. A typical art reference of this type is U.S. Pat. No. 2,762,689 which involved the reaction of NaCl and $H_2SO_4$ at temperatures of 200° to 250° C. Also in U.S. Pat. No. 2,275,825, $Na_2SO_4$ and hydrochloric acid are prepared by the reaction of a slurry comprising water, NaCl, $NaHSO_4$ and $H_2SO_4$ with steam in a countercurrent reaction zone at temperatures of 120° to 160° C. With respect to prior art of this type, it should be noted that the aqueous sulfuric acid systems of $Na_2SO_4$ and $K_2SO_4$ are not generally considered to be equivalent in the recovery of desired products as they behave differently. Thus, $K_2SO_4$ forms mixed acid salts on solution/crystallization whereas $Na_2SO_4$ forms hydrates of either $Na_2SO_4$ or $NaHSO_4$; e.g., see "Solubilities of Inorganic and Metal Organic Compounds", Seidel, 4th Ed., Vol. 2, pps. 1126–27.

In copending application Ser. No. 545,554, filed Jan. 30, 1975, commonly assigned with this application, there is disclosed a new procedure by which potassium sulfate is produced from potash and sulfuric acid in an aqueous system under moderate reaction conditions. This prior application discloses and claims a method for the production of potassium sulfate which comprises reacting potassium chloride with potassium bisulfate in an aqueous solution at a temperature of about 65°–110° C., permitting the solid potassium sulfate to crystallize from the solution by cooling to a temperature to about 40°–60° C. and recovering the solid potassium sulfate formed. There are also described methods by which a slurry of the potassium bisulfate is prepared by reaction of KCl and sulfuric acid as well as procedures wherein the reaction is carried out in the substantial absence of hydrogen chloride evolution and wherein after removal of the solid potassium sulfate, there is provided a filtrate solution which, after excess water removal, is suitable for recycle to the plant which provides for preparation of the potassium bisulfate starting material.

In the continuous procedure of the prior application however, only a portion of the potassium bisulfate produced in the initial step can be utilized in the second step for conversion to potassium sulfate. The method of the present invention overcomes this problem by providing a process whereby potassium sulfate is produced in a single step from potash and sulfuric acid under moderate reaction conditions.

SUMMARY OF THE INVENTION

It is accordingly one object of this invention to provide a method for the preparation of potassium sulfate.

A further object of the invention is to provide a method for the preparation of potassium sulfate in a single step under moderate reaction conditions and in high purity.

A still further object of the invention is to provide a continuous method for the production of potassium sulfate by contacting potassium chloride with sulfuric acid in an aqueous solution under moderate reaction conditions.

Other objects and advantages of the present invention will become apparent as the description thereof proceeds.

In satisfaction of the foregoing objects and advantages, there is provided by this invention a method for the production of potassium sulfate which comprises reacting potassium chloride (potash) with sulfuric acid in an aqueous solution at a temperature of about 65°–120° C., with evolution of gaseous hydrogen chloride, then further reacting the resulting reaction mixture at a temperature of about 80°–110° C. with removal of an azeotrope of HCl/water, adding to the resulting mixture an amount of water substantially corresponding to the amount of water removed with the azeotrope, and permitting the resulting solution to cool and the potassium sulfate to crystallize. Also provided is a continuous procedure for the continuous production of the potassium sulfate.

BRIEF DESCRIPTION OF THE DRAWING

Reference is now made to the drawing accompanying this application wherein there is shown a schematic diagram showing the process steps of a continuous method of the present invention.

DESCRIPTION OF PREFERRED EMBODIMENTS

As indicated above, the present invention is concerned with a unique method for the preparation of potassium sulfate ($K_2SO_4$), by the reaction of potassium chloride (KCl) and sulfuric acid in aqueous solution. It has been found that the simple procedures provided by this invention will operate to provide a relatively pure solid potassium sulfate.

Thus it has been found according to this invention that solid crystalline potassium sulfate can be prepared in a single step from potassium chloride and sulfuric acid in aqueous solutions under moderate reaction conditions. In particular, the process of this invention lends itself to a continuous operation which has numerous advantages from a commercial standpoint and particularly a continuous operation in which all of the essential reactants are substantially utilized. Further, an important feature of the invention is that it provides for the recovery of both gaseous hydrogen chloride as well as an aqueous solution of hydrogen chloride which can be used as such or from which gaseous hydrogen chloride can be easily recovered.

In general, in conducting the process of this invention, essentially equimolar quantities of potassium chloride and sulfuric acid are reacted in an aqueous system at temperatures of about 65°-120° C. to obtain a partially complete reaction with evolution of as much gaseous hydrogen chloride as will evolve at these temperatures. Under practical conditions, about 1 mole of hydrogen chloride would be removed from this step for each two moles of KCl employed as starting material. The resulting reaction mixture is then passed to an evaporator or similar reactor where at temperatures of about 90°-110° C., an azeotrope of hydrogen chloride and water is removed from the system by distillation means. In this aspect of the reaction, the removal of additional HCl/water by way of the azeotrope serves to complete the reaction by shifting the equilibrium of the reacting materials toward production of potassium sulfate on removal of the additional HCl. Theoretically, the reaction should operate to remove the total amount of HCl and result in a substantially complete conversion of the potassium chloride to potassium sulfate. The temperatures indicated in these steps are those preferred at atmospheric pressure. However, it is to be understood that these temperatures may be varied as desired by operating at subatmospheric or superatmospheric pressures.

In this reaction, when the theoretical amount of hydrogen chloride is removed, with the azeotrope in the evaporator, substantial water may also be removed thus resulting in a slurry of product remaining in the evaporator. Therefore, an important step of this invention is that additional water be added or replaced in the resulting mixture to again obtain a solution at the reaction temperatures of the azeotroping stage. This solution is then allowed to cool preferably at a temperature in the range of 30°-75° C. which will permit potassium sulfate to precipitate as substantially pure crystalline $K_2SO_4$.

In the continuous operation which is an important aspect of this invention, the slurry from the crystalline step is filtered to provide a potassium sulfate wet cake and a filtrate which can be recycled to the main reactor. The potassium sulfate wet cake may also be washed and the wash water recycled to the main reactor. Thus, the essential concept involved in the reaction is to remove the remainder of the HCl by distilling off the HCl/water azeotrope and then rediluting the mixture by the addition of an amount of water substantially equal to that removed with the azeotrope or at least sufficient water to again form a solution. This then provides a resulting solution wherein the theoretical amount of hydrogen chloride has been removed so that the potassium sulfate will precipitate from the solution as a substantially pure crystalline solid. Thus, the invention provides a method for the direct production of substantially pure crystalline potassium sulfate from potassium chloride and sulfuric acid without the isolation of the intermediate potassium bisulfate and the use of extreme reaction conditions to drive the reaction to completion.

Referring particularly to the initial step of the process of this invention, there is initially provided a reactor into which potassium chloride and sulfuric acid are introduced to effect reaction at a temperature of about 65°-120° C., preferably 90°-110° C. In a continuous operation all reactant conditions are made continuously. The KCl may be added either as a solid or as an aqueous solution but in the preferred embodiment, the KCl is added as a solid. In one aspect, the KCl and sulfuric acid may be mixed in a prereactor vessel at a temperature of about 40° to 60° C. and then introduced into the main reactor.

The general amounts of materials in the initial reactor will comprise substantially equimolar amounts of KCl and sulfuric acid, preferably concentrated $H_2SO_4$, contained in an excess of water which may be fresh water or recycle water from the separation step and which would contain ions of hydrogen, potassium, chloride, and sulfate. The amount of water necessary to conduct the reaction is that amount which will maintain an aqueous solution at the reaction temperatures involved. In conducting this aspect of the reaction, either of the reactants may be added in any desired manner but preferably the water is placed in the reactor at the indicated reaction temperatures and the KCl and sulfuric acid are added in increments thereto.

During this reaction, at the reaction temperatures indicated, the KCl and sulfuric acid will react with evolution of hydrogen chloride. Means are therefore provided in the reactor to remove gaseous hydrogen chloride and in the most preferred embodiment, the hydrogen chloride is retained by a water scrubbing system or other means well known to the art.

In the evaporator, means are provided for removal of the HCl/water azeotrope from the mixture. This azeotrope comprises essentially about 4-5 moles of HCl combined with about 1-2 moles of water. In the evaporator the removal of the water/HCl azeotrope is continued at the reaction temperatures indicated until the theoretical amount of HCl is removed from the system. Since a substantial portion of water has been removed from the reaction mixture it is then necessary to replace the water removed from the system and therefore means are provided for the addition of an amount of water equivalent to that removed with the azeotrope so as to again obtain solution as the reaction temperature used for the evaporation step.

It is, of course, to be appreciated that the HCl/water azeotrope can be treated for the recovery of dry HCl therefrom as the HCl as a valuable by-product. The prior art is, of course, well aware of means whereby the HCl can be recovered.

After the amount of water removed with the azeotrope is replaced, the resulting solution is passed to the crystallizer which is maintained at about 30°-80° C. lower than the reaction temperatures used in the evaporator. It is especially preferred that the crystallizer temperatures range from about 30°-75° C. In the crystallizer the solution is allowed to cool whereupon the solid potassium sulfate will crystallize from solution.

The resulting slurry is then subjected to separation as by a continuous filter, centrifuge or other means of separation to provide a wet cake of potassium sulfate and a filtrate which will contain ions of materials contained in the solution. This filtrate may be recycled to the premixer or main reactor to provide at least a portion of the water needed for aqueous solution. The wet potassium sulfate cake may be washed with water or a water solution containing potassium sulfate and the wash recycle may also be passed to the premixer or main reactor as additional water for the initial solution.

A preferred aqueous solution of potassium sulfate to be used in washing the cake will contain about 1.3 mols of $K_2SO_4$ in 71 mols of water. The saturated $K_2SO_4$ solution is preferred for use in washing the cake as it will not leach $K_2SO_4$ from the filter cake and also favors shifting the equilibrium of the reaction to $K_2SO_4$ formation.

It will thus be seen that the process of the invention provides a unique and effective procedure for the production of potassium sulfate directly from KCl and sulfuric acid without the necessity for excessive reaction conditions and with excellent conversions to provide a high purity product.

An especially important aspect of the present invention resides in the continuous system for carrying out the process of this invention and the continuous system is particularly shown in the drawing accompanying this application.

Referring now to the drawing where there is described a specific embodiment of this invention, it will be seen that there is provided initially a reactor 1 maintained preferably at a temperature of about 110° C. Into the reactor 1 are added solid potassium chloride by line 2 and sulfuric acid by line 3. In addition, recycle filtrate and recycle wash water are introduced into reactor 1 by lines 15 and 16 to provide the aqueous reaction medium. Obviously, fresh water may also be added. Under the reaction conditions the potassium chloride and sulfuric acid react with evolution of hydrogen chloride which is removed by line 4. The residence time for this reaction ranges from about 1 to 4 hours. On removal of the gaseous hydrogen chloride through line 4 the resulting reaction solution is passed to evaporator 6 by line 5 where at a temperature of 90°-110° C. and the use of distillation equipment an HCl/water azeotrope is continuously removed by line 7. The removal of the azeotrope is continued until substantially complete and the theoretical amount of HCl is removed from the system. The resulting reaction mixture in evaporator 6 is then passed by line 8 to crystallizer 10 but prior to introduction into crystallizer 10, an amount of water substantially equal to the amount of water removed during the azeotrope reaction in evaporator 6 is added by line 9 to maintain a solution. The crystallizer 10 into which this solution is introduced is maintained at a temperature of about 30°-75° C. and under conditions such that potassium sulfate is allowed to crystallize from the solution. On cooling to the indicated temperatures, the resulting slurry is removed by line 11 to filter 12 where a solid potassium sulfate cake is retained and the filtrate is recycled by line 16 to reactor 1. In the preferred aspect, the potassium sulfate filter cake is washed with fresh wash water or a solution of potassium sulfate in water introduced by line 14. The wash water is removed by line 15 and recycled to reactor 1. The wet filter cake comprising potassium sulfate is removed by line 13 for drying or other purification procedures.

It will thus be seen that this continuous procedure provides a unique concept for the production of potassium sulfate directly from KCl and sulfuric acid under moderate reaction conditions and without the need for isolation of $KHSO_4$ as an intermediate.

The following examples are presented to illustrate the invention but it is not to be considered as limited thereto. In these examples and throughout the specification parts are by weight unless otherwise indicated.

EXAMPLES 1 to 14

In these examples, a reactor system of the type shown in the attached drawing was utilized with the main reactor being maintained at 110° C. with a residence period of 2 hours, except that a premix vessel was used for mixing the reactants at a temperature of about 45° C. Thus, into the premix vessel was introduced 6.12 moles of KCl and 2.96 moles of sulfuric acid to form a solution in an aqueous reaction medium formed by the addition of the filtrate recycle and wash recycle from the filtering step at the completion of the reaction. The resulting solution was then passed to the main reactor for conducting the reaction wherein the KCl and sulfuric acid were allowed to react at 110° C. for 2 hours during which time 0.84 moles of gaseous HCl were removed from the system. By this procedure the materials were mixed at low temperatures and then raised to the reactant temperature of 110° C.

On removal of the gaseous HCl, the resulting solution was passed to the evaporator equipped for distilling off the HCl/water azeotrope. This vessel was maintained at 100° C. and an azeotrope removed from the system which contained 4.79 moles of HCl and 157 moles of water. On removal of this amount of the azeotrope, the mixture was then rediluted by adding an amount of water equivalent to the amount of water removed from the azeotrope. This resulted in a solution of the reacting mixture which was then passed to a crystallizer maintained at 45° C. In the crystallizer, the reactants were maintained for a sufficient period for essentially complete precipitation. The resulting slurry was then passed to a continuous filter for filtration of the crystalline solid from the slurry. The filtrate resulting from the crystalline solid was recycled to the premix reactor and on analysis showed that it contained the following proportions of materials:

| | |
|---|---|
| $K_2SO_4$ | 24.3 Mols |
| $KHSO_4$ | 5.5 Mols |
| HCl | 28.0 Mols |
| $H_2O$ | 358.2 Mols |

The wet unwashed filter cake was analyzed and found to contain 1.3 moles $K_2SO_4$, 3.4 moles $KHSO_4$, 5.47 moles KCl and 15.96 moles of water. This wet filter cake was then washed with water (Examples 1-14) or a solution comprising a saturated potassium sulfate solution maintained at 45° C. and containing 1.3 moles of $K_2SO_4$ in 71 moles of water (Examples 15-18). The resulting wash recycle which was recycled to the premix vessel containing materials washed from the filter cake was analyzed and found to contain the following concentrations of materials:

| | |
|---|---|
| $K_2SO_4$ | 0.43 Mols |
| KCl | 1.88 Mols |
| HCl | 3.10 Mols |
| $H_2O$ | 95.0 Mols |

The wet washed potassium sulfate cake was removed and analyzed to contain the following materials as follows:

| | |
|---|---|
| $K_2SO_4$ | 3.97 Mols |
| $KHSO_4$ | 0.30 Mols |
| KCl | 0.49 Mols |
| $H_2O$ | 10.7 Mols |

Under these reaction conditions, an 18 hour run was made over a 3-day work period by operation of the continuous system for 6 hours a day and then shutting down for the night. During the last 12 hours the filtrate and solid from the crystallizer were weighed and analyzed on a periodic basis. These filter cakes were dried and washed with a water or a $K_2SO_4$ solution.

In the following Table I there are set forth the conditions and the results for the experiments using a water wash. The chloride values in the wet cake ranged from 8% to about 37%.

TABLE I

| Exp. No. | Time Min. | Wt. Filt. | Filtrate Wt.% K₂O | Filtrate Wt.% SO₄⁼ | Filtrate Wt.% Acid Ion | Filtrate Wt.% Cl⁻ | Wt. Cake | Product Cake-Unwashed-Wet Wt.% K₂O | Product Cake-Unwashed-Wet Wt.% SO₄⁼ | Product Cake-Unwashed-Wet Wt.% Acid Ion | Product Cake-Unwashed-Wet Wt.% Cl⁻ | Wt.% Cl⁻ | Distillate Wt. Dist. | Distillate Wt. Cl in Dist. | Diffraction Product Cake-Dried & Unwashed K₃H(SO₄)₂ | Diffraction Product K₂SO₄ | Diffraction Product KCl |
|---|---|---|---|---|---|---|---|---|---|---|---|---|---|---|---|---|---|
| 1 | 660 | 1029 | | | | | 193 | | | .28 | 14.71 | 5.75 | 418 | 24.03 | | | |
| 2 | 720 | 1089 | 20.19 | 22.59 | .294 | 8.33 | 214 | 46.70⁽¹⁾ | 38.57⁽¹⁾ | .29⁽¹⁾ | 15.46⁽¹⁾ | 4.46 | 460 | 20.52 | | | |
| 3 | 780 | 1174 | | | | | 17 | | | .05 | 37.37 | 3.45 | 354 | 12.21 | | | |
| 4 | 840 | 1087 | | | .299 | 8.38 | 235 | | | .27 | 16.03 | 4.48 | 336 | 15.05 | | | |
| 5 | 900 | 951 | | | | | 92 | | | .32 | 7.68 | 6.88 | 420 | 28.90 | 5 | 10 | 40 |
| 6 | 960 | 1102 | | | | | 51 | | | .15 | 20.03 | 7.35 | 454 | 33.37 | | | |
| 7 | 1020 | 1130 | | | .267 | 8.61 | 158 | | | .28 | 12.40 | 6.54 | 441 | 28.84 | | | |
| 8 | 1080 | 1014 | 21.20 | 20.35 | .252 | 8.32 | 87 | 48.93⁽¹⁾ | 33.36⁽¹⁾ | .22⁽¹⁾ | 18.92⁽¹⁾ | 6.81 | 482 | 32.77 | 30 | | 50 |
| 9 | 1140 | 871 | | | | | 355 | 44.86⁽¹⁾ | 36.05⁽¹⁾ | .33⁽¹⁾ | 17.96⁽¹⁾ | 6.43 | 383 | 24.63 | | | |
| 10 | 1200 | 927 | | | .379 | 7.89 | 13 | | | .26 | 10.69 | 6.52 | 441 | 28.75 | | | |
| 11 | 1260 | 984 | | | | | 0 | | | | | 9.09 | 411 | 37.36 | | | |
| 12 | 1320 | 1004 | | | .272 | 8.16 | 171 | | | .24 | 14.43 | 2.97 | 481 | 14.29 | | | |
| 13 | 1380 | 946 | | | | | 177 | | | .31 | 8.00 | 4.19 | 446 | 18.69 | 20 | 15 | 10 |
| 14 | 1440 | 1006 | 20.97 | 20.97 | .275 | 8.09 | 27 | 46.68⁽¹⁾ | 47.00⁽¹⁾ | .29⁽¹⁾ | 7.98⁽¹⁾ | 4.31 | 449 | 19.36 | | | |

Dry Unwashed Cakes

In the following experiments, washing of the cake was carried out using saturated solutions of $K_2SO_4$ and the potassium sulfate wet cake are set forth in the following Table II.

Table II

| | | PRODUCT CAKES WASHED WITH SATURATED POTASSIUM SULFATE SOLUTION | | | | | | | | | | |
|---|---|---|---|---|---|---|---|---|---|---|---|---|
| | | Dry Unwashed Cakes-Grams | | | | | Dry Washed Cakes-Grams | | | | | Diffraction |
| Exp. No. | Time | Wt. of Cake | $K_2O$ | $SO_4^=$ | Acid Ion | Cl | Wt. of Cake | $K_2O$ | $SO_4^=$ | Acid Ion | Cl | $K_2SO_4$ | $K_3H(SO_4)_2$ |
| 15 | 660 | 120.9 | 48.8 | 41.5 | 0.37 | 19.5 | 71.6 | 39.5 | 36.0 | .02 | 1.74 | | |
| 16 | 1140 | 119.9 | 53.8 | 43.2 | 0.40 | 21.5 | 67.9** | 37.3 | 32.8 | .03 | 2.59 | | |
| 17 | 1140B* | 132.6 | 59.5 | 47.8 | 0.44 | 23.8 | 48.6 | 26.8 | 24.9 | .0001 | .05 | | |
| 18 | 1440 | 128.2 | 59.9 | 60.3 | 0.37 | 10.2 | 86.7 | 45.8 | 41.9 | .05 | .51 | 90% | 10% |

*Cake Repulped
**Crystallized 80° C.

this was found to substantially reduce the chloride concentration in the filter cake. Thus, by washing with saturated potassium sulfate aqueous solutions, the chloride contents could be reduced substantially. The saturated $K_2SO_4$ solutions had a density of 1.088 and contained 11.9 wt.% $K_2SO_4$. The results of the run using The following Table III sets forth data which shows the effectiveness of washing the filter cakes with first and second wash solutions of $K_2SO_4$ in water and graphically demonstrates the amount of chloride ion removed thereby. This Table is as follows:

TABLE III

| Time | Vol. of 1st Wash | First Wash Solution - Grams |  |  |  |  | Vol. of 2nd Wash | Second Wash Solution - Grams |  |  |  |  | Removed by Washing |  |  |  |  | Wt. % Cl in Cake |  |
|---|---|---|---|---|---|---|---|---|---|---|---|---|---|---|---|---|---|---|---|
|  |  | Wt. % of Soln. | K₂O | SO₄⁼ | Acid Ion | Cl | | Wt. % of Soln. | K₂O | SO₄⁼ | Acid Ion | Cl | Tot. | K₂O | SO₄⁼ | Cl | H⁺ | Before Wash | After Wash |
| 660 | 100 | 129.09 | 15.8 | 13.9 | 20 | 9.9 | 100 | 134.4 | 14.4 | 10.4 | 0.13 | 7.8 | 40.8 | 19.1 | 11.3 | 91.1 | 94.6 | 16.1 | 2.4 |
| 1140 | 100 | 113.8 | | | 27 | 11.2 | 100 | 131.4 | | | 0.12 | 8.2 | 41.4 | 30.7 | 24.1 | 88.0 | 92.3 | 18.0 | 3.5 |
| 1140B* | 200 | 259.1*** | | | 35 | 18.3 | 100 | 95.8 | | | 0.02 | 0.9 | 61.3 | 55.0 | 47.9 | 99.8 | 99.9t | 18.0 | 0.1 |
| 1440 | 100 | | | | | | 100 | | | | | | 32.4 | 24.5 | 30.5 | 95.0 | 96.5 | 1.0 | 0.6 |
| Average (Excluding repulp) | | | | | | | | | | | | | | 24.5 | 21.3 | 91.4 | 91 | | |

*Cake repulped
**Crystallized 80° C
***Repulp solution

The invention has been described herein with reference to certain preferred embodiments. However, as obvious variations thereon will become apparent to those skilled in the art, the invention is not to be limited thereto.

What is claimed is:

1. A method for the production of potassium sulfate and potassium hydrogen sulfate which comprises initially reacting potassium chloride and sulfuric acid in an aqueous medium at a temperature of about 65° to 120° C. under conditions to form hydrogen chloride and removing a portion of the hydrogen chloride from the reaction zone by gaseous evolution, thereafter subjecting the resulting aqueous solution to azeotropic distillation at temperatures in the range of from 90° to 110° C., and removing an HCl/water azeotrope until the remainder of the hydrogen chloride has been removed, and form a resulting aqueous slurry, thereafter adding to the resulting aqueous slurry an amount of water which is substantally equivalent to the amount of water removed with the azeotrope to again form an aqueous solution, cooling the aqueous solution to a temperature of about 30°-75° C., to allow a solid precipitate to crystallize from solution, and recovering the solid which comprises a mixture of potassium sulfate and potassium hydrogen sulfate.

2. A process according to claim 1 wherein the temperature in the initial step is about 90°-110° C.

3. A method according to claim 1 wherein the solid recovered is washed with an aqueous solution selected from the group consisting of water and an aqueous solution containing potassium sulfate to remove potassium hydrogen sulfate from the solid to provide a solid potassium sulfate and an aqueous solution containing potassium hydrogen sulfate.

4. A continuous procedure for the production of potassium sulfate which comprises reacting potassium chloride and sulfuric acid in an aqueous medium in an initial reaction step at a temperature of about 65° to 120° C. under conditions to form hydrogen chloride and removing a portion of the hydrogen chloride from the reaction zone by gaseous evolution, thereafter subjecting the resulting aqueous solution to azeotropic distillation at temperatures in the range of 90°-110° C while removing an HCl/water azeotrope and continuing removal of the azeotrope until the remainder of the hydrogen chloride has been removed; and form an aqueous slurry, thereafter adding to the aqueous slurry an amount of water which is substantially equivalent to the amount of water removed with the azeotrope to again form an aqueous solution, cooling the resulting solution to a temperature in the range of about 30°-75° C. to allow a solid precipitate to crystallize from solution. separating the solid precipitate from the solution, recycling the separated solution to the initial reaction step, washing the separated solid precipitate with a member selected from the group consisting of water and an aqueous solution containing potassium sulfate, to form a solid and a wash filtrate, recycling the wash filtrate to be initial reaction step and recovering the solid comprising potassium sulfate.

5. A method according to claim 4 wherein the initial reaction step is conducted at a temperature of about 90°-110° C.

6. A method according to claim 4 wherein the separated solid precipitate is washed with an aqueous solution saturated with potassium sulfate.

* * * * *